(12) United States Patent
Maier et al.

(10) Patent No.: US 12,303,344 B2
(45) Date of Patent: May 20, 2025

(54) ANGLED-HEAD ROTARY CLEANING DEVICE FOR DENTAL PURPOSES

(71) Applicant: KAVO DENTAL GMBH, Biberach an der Riss (DE)

(72) Inventors: Matthias Maier, Biberach an der Riss (DE); Andreas Thanner, Biberach an der Riss (DE); Thomas Classen, Herbertingen (DE); Marcel Ott, Zwiefalten (DE); Dennis Krueger, Geislingen (DE); Alexander Klee, Biberach an der Riss (DE)

(73) Assignee: KAVO DENTAL GMBH, Biberach an der Riss (DE)

(*) Notice: Subject to any disclaimer, the term of this patent is extended or adjusted under 35 U.S.C. 154(b) by 491 days.

(21) Appl. No.: 17/662,026

(22) Filed: May 4, 2022

(65) Prior Publication Data
US 2022/0354626 A1 Nov. 10, 2022

Related U.S. Application Data

(60) Provisional application No. 63/184,999, filed on May 6, 2021.

(51) Int. Cl.
| | | |
|---|---|---|
| A61C 17/22 | (2006.01) | |
| A61C 1/08 | (2006.01) | |
| A61C 17/00 | (2006.01) | |
| A61C 17/34 | (2006.01) | |

(52) U.S. Cl.
CPC ............ *A61C 17/222* (2013.01); *A61C 1/088* (2013.01); *A61C 17/005* (2013.01); *A61C 17/3436* (2013.01)

(58) Field of Classification Search
CPC . A61C 17/222; A61C 17/005; A61C 17/3436; A61C 1/088
See application file for complete search history.

(56) References Cited

U.S. PATENT DOCUMENTS

| | | | |
|---|---|---|---|
| 2012/0301841 A1* | 11/2012 | Garcia | A61C 1/08 433/29 |
| 2018/0014909 A1* | 1/2018 | Larsen | A61C 1/05 |
| 2019/0110863 A1* | 4/2019 | Wilson | A61B 5/0088 |
| 2020/0390532 A1 | 12/2020 | Racine | |

FOREIGN PATENT DOCUMENTS

WO  WO-2019055678 A1 * 3/2019  ........... A61B 1/0638

* cited by examiner

*Primary Examiner* — Shay Karls
(74) *Attorney, Agent, or Firm* — Michael Best & Friedrich LLP (57) ABSTRACT

An angled-head rotary cleaning device for dental purposes includes a plastic housing having an elongated neck portion that defines a sleeve with a wall. The neck portion includes a first end and a second end. The plastic housing has a head portion coupled to the first end of the neck portion and angled relative to the neck portion. The cleaning device also includes an elongated light guiding element having a light entry portion to receive light, and a light exit portion to emit light. At least a portion of the light guiding element is accommodated within the wall of the neck portion.

19 Claims, 10 Drawing Sheets

ANGLED-HEAD ROTARY CLEANING DEVICE FOR DENTAL PURPOSES

CROSS-REFERENCE TO RELATED APPLICATIONS

This application claims priority to U.S. Provisional Application No. 63/184,999, filed May 6, 2021, the entire contents of which are incorporated herein by reference.

BACKGROUND

Dentists often use angled-head rotary cleaning devices known as "prophy" (prophylaxis) angle pieces with a longitudinal neck portion and a head portion that is angled relative to the neck. The angled head terminates into or holds a rotary tool which is dipped into a cleaning paste or other treatment material and then applied to a patient's teeth at a variable rotational speed. The rotary tool is most commonly a relatively soft "cup" used to apply paste or treatment material but different types of such cleaning tools are known for different purposes, such as brushes and rubber points.

At its rear end, the neck portion is coupled to a driving component which can be a motor handpiece or an adapter element for coupling the neck portion with a motor handpiece wherein a rotary movement provided by the driving component is transferred to the cleaning tool located at the neck portion by means of transmission elements accommodated in the neck portion and/or the head portion.

Usually, such cleaning devices as explained above are provided as disposable devices, i.e., they are intended for single-use and will be discarded afterwards. In this way, a complex cleaning and sterilization of the devices can be avoided. Consequently, production costs for these devises are a significant factor and, therefore, prophy angle pieces are often made from plastic and manufactured by injection molding.

On the other hand, dental treatment requires a good visibility of the area to be treated. It is thus generally known that more complex treatment devices like reprocessable straight and contra-angle handpieces comprise a light source which is adapted to emit light in the region just in front of the treatment tool, e.g. in the direction of the tip of a dental drill. However, the production of such reprocessable straight and contra-angle handpieces is more complex and cost-intensive such that integrating a light source in the headpieces does not significantly influence the production costs.

In this regard, U.S. Patent Publication No. 2020/0390532 A1 discloses a prophy angle piece wherein a light emitting diode (LED) is attached to a front portion of the neck to provide a treatment light. Cables providing an electrical connection to a driving component are arranged within the interior of the sleeve-like neck portion. As an alternative solution, a fibre optic element is arranged within the neck portion running from the rear end to a region close to the head portion wherein the fibre optic element transmits light provided by the driving component to the light emitting end again to provide a treatment light.

SUMMARY

One example provides an angled-head rotary cleaning device for dental purposes includes a plastic housing having an elongated neck portion that defines a sleeve with a wall. The neck portion includes a first end and a second end. The plastic housing has a head portion coupled to the first end of the neck portion and angled relative to the neck portion. The cleaning device also includes an elongated light guiding element having a light entry portion to receive light, and a light exit portion to emit light. At least a portion of the light guiding element is accommodated within the wall of the neck portion.

Another example provides an angled-head rotary cleaning device includes a plastic housing having an elongated neck portion that defines a sleeve with a wall. The neck portion includes a first end and a second end. The plastic housing has a head portion coupled to the first end of the neck portion and angled relative to the neck portion. The cleaning device also includes a transmission element disposed within the plastic housing. The transmission element includes an elongated driving shaft having at a rear end a pin-shaped coupling portion. The cleaning device also includes an elongated light guiding element coupled to the neck portion. The light guiding element has a light entry portion for receiving light provided by a driving component, and a light exit portion positioned to emit light.

Another example provides an angled-head rotary cleaning device includes a plastic housing having an elongated neck portion that defines a sleeve with a wall. The neck portion includes a first end and a second end, the plastic housing having a head portion coupled to the first end of the neck portion and angled relative to the neck portion. The cleaning device also includes an elongated light guiding element coupled to the neck portion, the light guiding element having a light entry portion for receiving light provided by a driving component, and a light exit portion positioned to emit light. The light guiding element is configured to be coupled to a connecting portion of the driving component for securing the cleaning device against rotation with respect to the driving component.

Other aspects, examples, instances, and various embodiments will become apparent by consideration of the detailed description and accompanying drawings.

DETAILED DESCRIPTION

Before any aspects, examples, instances, and any embodiments are explained in detail, it is to be understood that embodiments are not limited in their application to the details of construction and the arrangement of components set forth in the following description or illustrated in the following drawings. Other aspects, examples, instances, and embodiments are possible and aspects, examples, instances, and embodiments described and illustrated are capable of being practiced or of being carried out in various ways.

The solutions of U.S. Patent Publication No. 2020/0390532 A1, described above, significantly complicate the production of prophy angle pieces, resulting in increased productions costs. Thus, there is a need for operating a disposable prophy angle piece with light, as is possible with reprocessable straight and contra-angle handpieces, wherein the productions costs can be kept at a reasonable level. The above-mentioned problem is solved by the devices and systems as described herein.

The present disclosure is generally directed to a dental cleaning device, and more specifically to a so-called disposable prophy angle piece. A light guiding element is used to transfer light provided by a driving component to a position close to the head portion. Light enters the light guiding element at its rear end and is guided to a light exit portion, which emits the light in such a way that the region around the cleaning tool of the device is illuminated. By accommodating at least a portion of the light guiding element in the wall of the neck portion, use of a separate fibre optic element, which has to be separately arranged within the cleaning device, can be avoided, which makes the assembly and production of the cleaning device less complex resulting in reduced production coasts.

Accordingly, in line with a first aspect, an angled-head rotary cleaning device for dental purposes is provided having a housing which is made from plastic and forms an elongated neck portion and a head portion located at a first end of and being angled relative to the neck portion. A second end of the neck portion is adapted to removably couple with a driving component providing a rotary movement and wherein the neck portion forms a sleeve with a wall. The housing accommodates transmission elements for transferring a rotary movement from the driving component to a cleaning tool being provided at the head portion. The cleaning device further includes an elongated light guiding element, the light guiding element having a light entry portion being positioned at the second end of the neck portion for receiving light provided by the driving component and a light exit portion being positioned close to the head portion. At least a portion of the light guiding element is accommodated within the wall of the neck portion.

Using the light guiding element and accommodating at least a portion of it in the wall of the neck portion results in several advantages compared to the use of a fiber optic element. At first, the light guiding element, which is made from a transparent plastic material and is preferably formed by injection molding, can be optimized with respect to the light entry portion, the light guiding portion, and the light exit portion. In contrast to the fiber optic element, no separate or additional optical elements are required to ensure efficient light injection and light emission, since the light guiding element itself can already be designed to be optimized in this respect. Further, integrating the light guiding element in the wall of the cleaning device can be achieved much easier than separately arranging the fiber optic within the neck portion.

In some examples, the light guiding element is elongated in a longitudinal direction of the cleaning device and is positioned on a bottom side of the cleaning device, which is where the cleaning tool being provided at the head portion. In this way, the light exit portion can be arranged to provide the maximum available light for illumination of the cleaning tool.

In some examples, the light guiding element is held by the neck portion via a form-locking connection. The light guiding element integrates into the outer geometry of the neck portion leaving the outer geometry of the cleaning device as unchanged as possible. This results in the advantageous retention of the known ergonomic outer contour of such devices.

To realize to form-locking connection, the light guiding element can be formed by a separate element, which is snap-fittingly attached to the neck portion. Another solution is to form the neck portion of the cleaning device by two housing components, in particular two half shells, which are latched with each other thereby clampingly holding the light guiding element. In this second solution, the housing components preferably include corresponding longitudinal grooves in their respective walls. The groves form a channel for accommodating at least a portion of the light guiding element. In both alternatives, attaching the light guiding element to the neck portion can be realized in a fast, efficient, and reliable way.

In case the light guiding element is attached to the neck portion by the form-locking connection mentioned above, the light guiding element can also serve to lock the drive axis of the cleaning device. Accordingly, the light guiding element can include a catching portion facing toward the interior of the neck portion, wherein the catching portion is adapted for axially fixing a transmission element extending through the neck portion. In this situation, the light guiding element performs two functions at once, i.e. transmitting the light to the cleaning tool and fixing the transmission element. In this way, the number of components forming the cleaning device can be kept at a minimum level.

As an alternative to the form-locking connection, the light guiding element also can be held by the neck portion via a material-locking connection. To realize this material-locking connection, the light guiding element can be formed by injection molding, wherein the wall of the neck portion provides a channel or groove in which the material forming the light guiding element is injected. Alternatively, it is possible to connect the light guiding element to the neck portion by over-molding the light guiding element with the plastic material forming the neck portion.

In some examples, the light entry portion of the light guiding element is adapted to co-operate with a connecting portion of the driving component for securing the cleaning device against rotation with respect to the driving component. This can be achieved by providing a light guiding element, wherein the light entry portion forms a protrusion or a recess which is adapted to engage with a corresponding recess or protrusion provided at the driving component. Again, the light guiding element not only serves to transmit light but also provides additional functionality resulting in a reduced number of individual parts.

For receiving the rotary movement provided by the driving component, the transmission element accommodated in the neck portion can include an elongated driving shaft having at its rear end a pin-shaped coupling portion, which is adapted to co-operate with a clamping mechanism of the driving component. The resulting structure of the coupling mechanism can be extremely simple, at least with respect to the side of the cleaning device. Again, this helps to keep the productions costs of the cleaning device at the desired low level.

This simple structure of the coupling mechanism in connection with the concept of using a light guiding element also forms an aspect, which can be realized independent from the question in which way the light guiding element is attached to the cleaning device.

Accordingly, in line with a second aspect, an angled-head rotary cleaning device for dental purposes is provided having a housing which is made from plastic and forms an elongated neck portion and a head portion located at a first end of and being angled relative to the neck portion, wherein a second end of the neck portion is adapted to removably couple with a driving component providing a rotary movement and wherein the neck portion forms a sleeve with a wall. The housing accommodates transmission elements for transferring a rotary movement from the driving component to a cleaning tool being provided at the head portion, and wherein the transmission elements accommodated in the neck portion include an elongated driving shaft having at its rear end a pin-shaped coupling portion which is adapted to co-operate with a clamping mechanism of the driving component. The cleaning device further includes an elongated light guiding element having a light entry portion being positioned at the second end of the neck portion for receiving light provided by the driving component and a light exit portion being positioned close to the head portion.

Further, the concept of additionally using the light guiding element for securing the cleaning device against rotation forms a third aspect according to which an angled-head rotary cleaning device for dental purposes is provided having a housing which is made from plastic and forms an elongated neck portion and a head portion located at a first end of and being angled relative to the neck portion. A second end of the neck portion is adapted to removably couple with a driving component providing a rotary movement. The neck portion forms a sleeve with a wall, the housing accommodating transmission elements for transferring a rotary movement from the driving component to a cleaning tool being provided at the head portion. The cleaning device further includes a light guiding element, with a light entry portion for receiving light provided by the driving component and a light exit portion being positioned close to the head portion, wherein the light exit portion is adapted to co-operate with a connecting portion of the driving component for securing the cleaning device against rotation with respect to the driving component.

The present disclosure also provides a dental cleaning system having an angled-head rotary cleaning device as explained above and a driving component adapted to removably couple with the cleaning device to provide a rotary movement, which is transmitted to the cleaning device, wherein the driving component includes means for providing light to the light guiding element of the cleaning device.

According to the present disclosure, the driving component can be a motor handpiece having a motor, (e.g., an electric motor), for driving the driving shaft. The motor handpiece is directly coupleable with the cleaning device and includes a light source facing toward the light entry portion of the light guiding element of the cleaning device. Alternatively, the driving component can be an adapter element being coupleable with a first end to the cleaning device and with a second end with a motor handpiece providing a rotary movement. The adapter element includes transmission elements for transmitting the rotary movement provided by the motor handpiece to the cleaning device. In this second alternative solution, the adapter element includes a light source being located at the first end for providing light directly to the light guiding element of the cleaning device or a light guide facing with a first end toward the motor handpiece for receiving light provided by a light source of the motor handpiece and facing with a second end toward the light entry portion of the light guiding element of the cleaning device.

Figure 1:
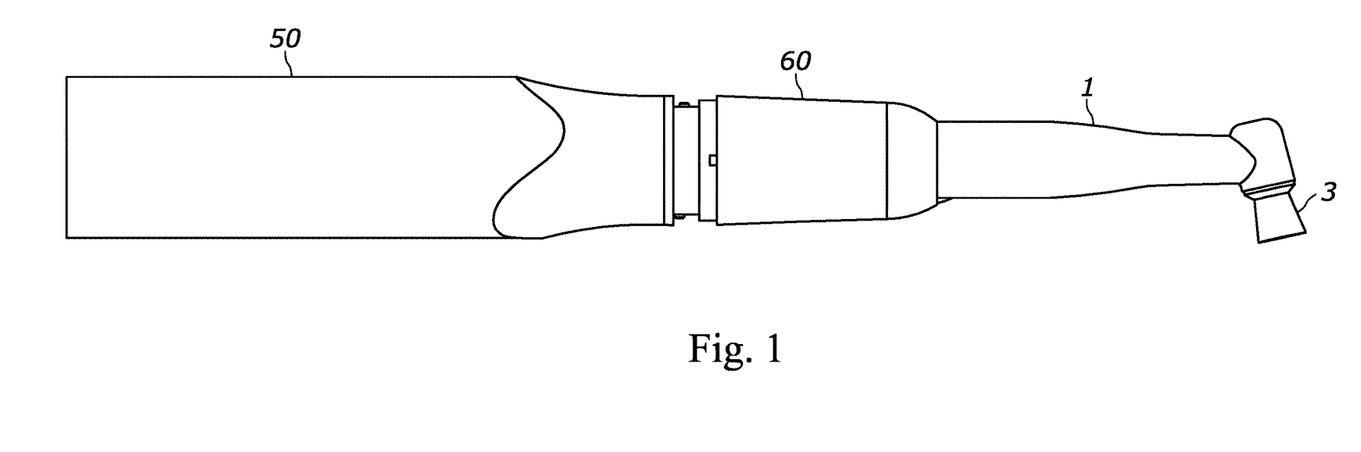
FIG. 1 generally illustrates a dental cleaning system based on a disposable prophy angle according to one example.

With reference to FIG. 1, a dental cleaning system based on a so-called disposable prophy angle (DPA for short) is known in the prior art. The system as shown in FIG. 1 includes three main components: a motor handpiece 50, an adapter element 60 and the DPA forming an angled-head rotary cleaning device 1.

The motor handpiece 50 is a longitudinal, generally cylindrical handpiece component having internally an electric motor providing a rotary movement. Motor handpiece 50 can include internal power supply components such as batteries or accumulators or alternatively can be connected to an external power supply via a cable, which is not shown in the drawings. The electric motor provides rotary movement with variable speed, which is transmitted to a cleaning tool 3 located at the front end of cleaning device 1.

In many solutions known from the prior art, the cleaning device 1 is not directly coupled to the motor handpiece 50, but an intermediate component is used as an adapter. FIG. 1 also shows such an adapter element 60, which is coupled at its rear end to the motor handpiece 50 and at its front end to the cleaning device 1. The adapter element 60 may be designed in accordance with the provisions of DIN EN ISO14457, and enables flexible connection of different cleaning devices to the motor handpiece 50, whereby the rotary movement provided by the motor handpiece 50 is transmitted to the cleaning device 1 via internal transmission elements. As a further advantage resulting from the use of the adapter element 60, the distance between the motor handpiece 50 and the cleaning device 1 is increased. This is an important aspect, as the cleaning device 1 should be the only component in direct contact with a patient. As mentioned above, the cleaning device 1 is designed as a disposable device that is disposed of after use, whereas the motor handpiece 50 is used multiple times, but must be cleaned and/or sterilized through a complex reprocessing process. Therefore, contamination of the motor handpiece 50 should be avoided.

In general, it is desirable to improve the visibility of the area treated by the cleaning device 1 by directing light to the corresponding area. In the prior art, it is known from U.S. Patent Publication No. 2020/0390532 A1 to integrate an LED in the cleaning device 1, which is supplied by the motor handpiece 50 via cables that extend through the cleaning device 1 and have connection sections suitable for coupling with corresponding connections on the motor handpiece 50. The present disclosure provides a more economical solution that still allows light to be efficiently directed to the front area of the cleaning tool 3, however the cleaning device 1 can be manufactured at a lower cost.

The examples described herein use a light guiding element, which is integrated in the cleaning device 1 and transmits light received from a driving component to a light exit portion in such a way that light is directed to the cleaning tool 3.

Figure 2A:
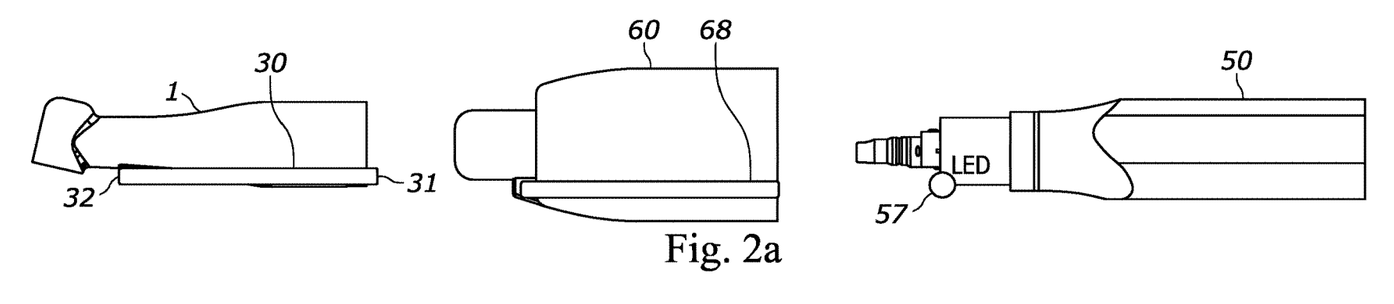
FIGS. 2a to 2c illustrate three different alternative examples for providing light for the disposable prophy angle.
Figure 2B:
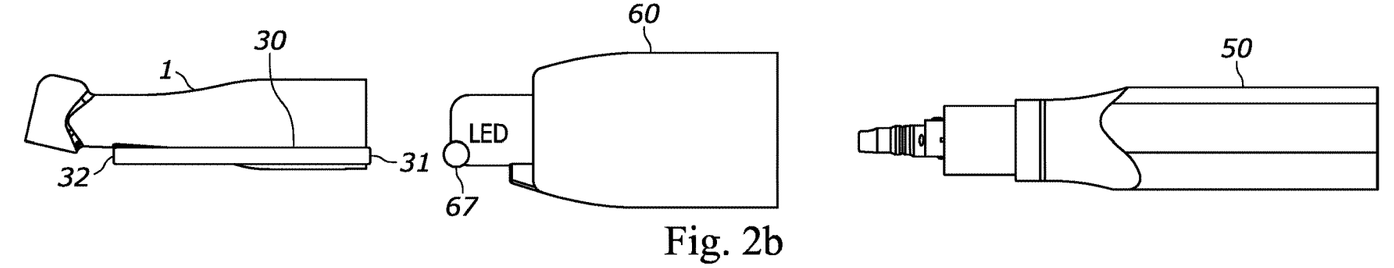
Figure 2C:
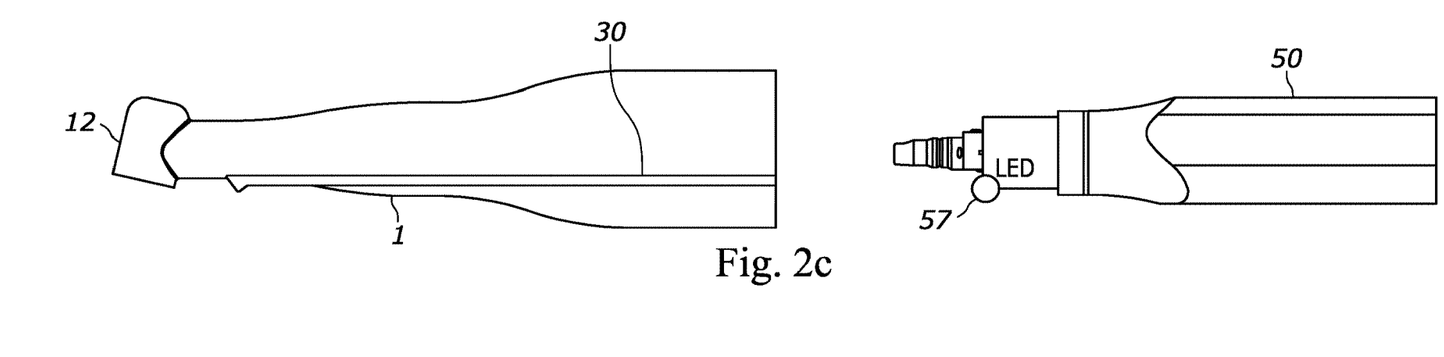
Figure 3:
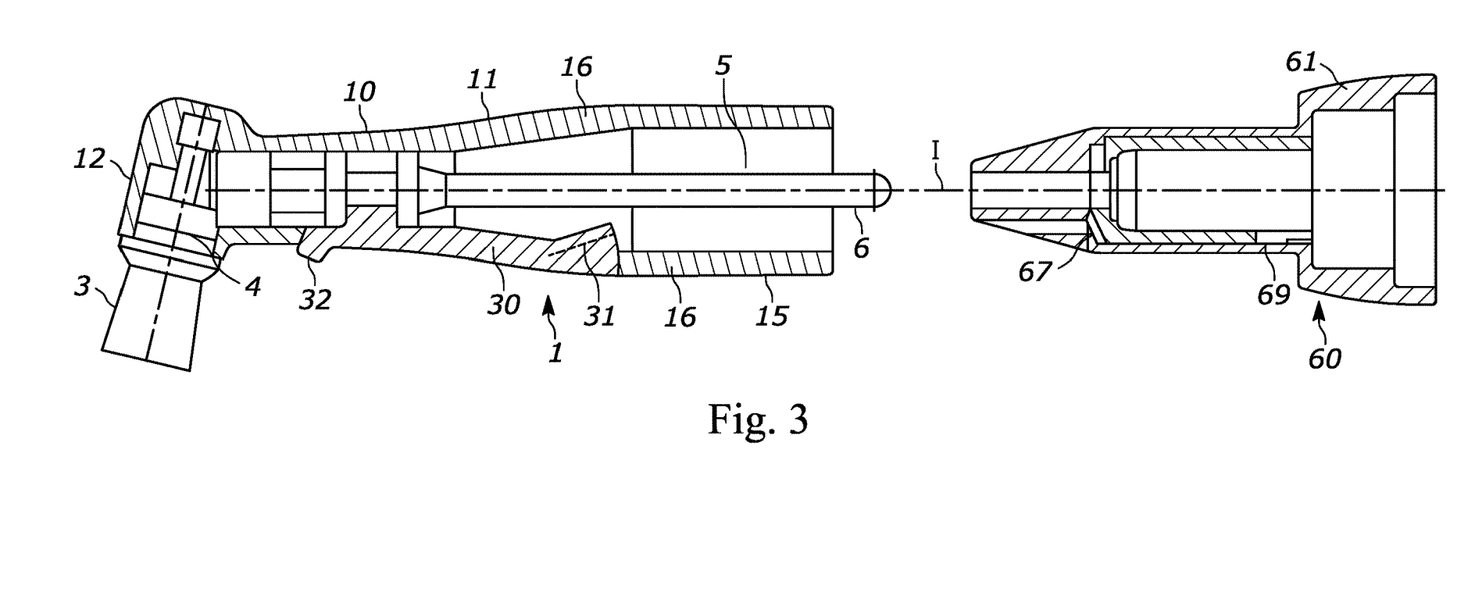
FIGS. 3 to 6 illustrate a first example of a disposable prophy angle with a light guiding element.
Figure 4:
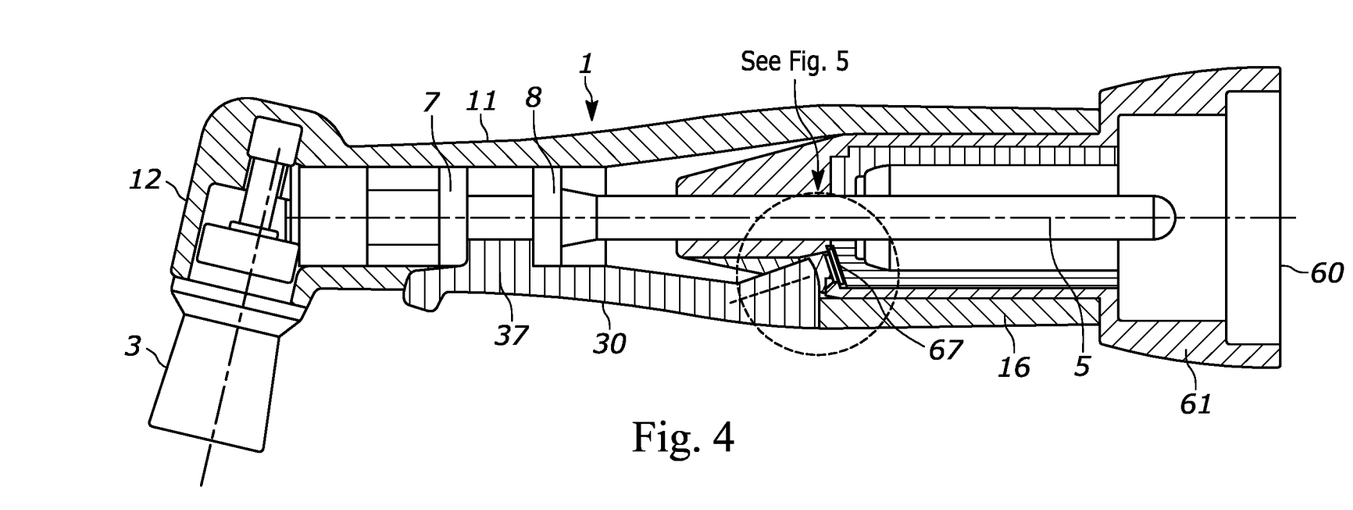

FIGS. 2*a*-2*c* show three general alternatives to achieve illumination of the treatment area in accordance with the present disclosure, which differ with respect to the location of the primary light source.

In the example shown in FIG. 2*a*, the cleaning system again includes the three components, i.e. the motor handpiece 50, the adapter element 60, and the angled-head rotary cleaning device 1. Here, a light source formed by a light-emitted diode (LED) 57 is provided at the motor handpiece 50. The LED 57 is provided at the front end of motor handpiece 50 in the area of a coupling portion being adapted to couple with the rear end of adapter element 60. Light generated by the LED 57 is transferred via a first light guide 68 to the front portion of adapter element 60. When coupled with the cleaning device 1, light forwarded by the first light guide 68 enters a light entry portion 31 of the light guiding element 30, which finally emits light at its light exit portion 32, which is positioned close to a head portion 12 of cleaning device 1 (e.g., where cleaning tool 3 is located).

As illustrated in FIG. 2b, the intermediate adapter element 60 is used to transmit rotary movement provided by the motor handpiece 50 to the cleaning device 1. A light source 67, which is again formed by an LED, is provided at adapter element 60, in particular at the front coupling portion of adapter element 60, which connects to the rear portion of the cleaning device 1. Similar to the solution of FIG. 2a, a light guiding element 30 is integrated in the cleaning device 1 such that light generated by LED light source 67 enters light guiding element 30 at its light entry portion 31 and is then forwarded to and emitted at light exit portion 32 of the light guiding element 30. In this example, the adapter element 60 includes electrical connection components, which connect to the motor handpiece 50 to provide power for driving the LED light source 67.

With reference to FIG. 2c, the adapter element 60 is omitted and the cleaning device 1 is directly coupled with motor handpiece 50. Here, the length of the cleaning device 1 is increased compared to the two solutions shown in FIGS. 2a and 2b to ensure that the head portion 12 of the cleaning device 1 is separated from the motor handpiece 50 by a sufficient distance. In this solution, the primary light source is again an LED 57 arranged at the coupling portion of motor handpiece 50 and a light guiding element 30 extending from the rear end of cleaning device 1 to a front portion close to the head portion 12 transfers the light to illuminate the region of the cleaning tool 3.

FIGS. 2a, 2b, and 2c schematically show the general concept of the present disclosure of using a light guiding element 30, which is integrated in the cleaning device 1 and transfers a light provided by a driving component (which can be the motor handpiece 50 or the adapter element 60) to the region where the cleaning tool 3 is located. The present disclosure in particular makes use of specific integration techniques allowing reducing production costs for the cleaning device 1 while at the same time an efficient light transmission can be achieved. Several examples of the three alternative solutions will be explained in more detail in the following.

With reference to FIGS. 3-7, an angled-head rotary cleaning device 1 is coupled to an adapter element 60. As known from the prior art, the adapter element 60 has the main function of transmitting a rotary motion provided by a motor handpiece—not shown—to the cleaning device 1 to rotate the cleaning tool 3. The transmission within the cleaning device 1 is performed by means of an elongated transmission element 5 extending through a sleeve-shaped neck portion 11 of a housing 10. The head portion 12 is coupled (e.g., releasably coupled or fixed) to a first, front end of the neck portion 11, and a second, rear end of the neck portion 11 is coupled (e.g., releasably coupled) to the adapter element 60 or to the motor handpiece 50. In the illustrated example, a second rotary element 4 (transmission element) is arranged at the head portion 12 of the cleaning device 1, and couples to the transmission element 5 via an angular gear and carries the cleaning tool 3 at its front end. In some examples, all components of the cleaning device 1 are made of plastic, which enables a reduction in material costs.

In the illustrated example, the rear end portion of the transmission element 5 forms a pin-shaped coupling portion 6, which extends into the adapter element 60 and engages with a clamping mechanism of the adapter element 60 to enable transmission of motion.

With continued reference to FIGS. 3-7, the adapter element 60 carries at its front portion at least one light source 67 configured to be coupled to the cleaning device 1. The light source 67 may be positioned over the entire circumference of the cylindrical coupling section and thus be annular in shape. Other examples include different shapes. In some examples, the light source 67 extends only partially around the entire circumference. In some examples, the light source 67 is a single LED forming a point light source. The light source 67 can have any color, or can be ultraviolet. In the illustrated example, the LED light source 67 is a white light LED. The light source 67 emits light toward the cleaning device 1, for example at a defined angle α between 0° and 25° with respect to an axis of rotation I. As described further herein, this angle improves the transmission of the light to the light guiding element 30.

Figure 5:
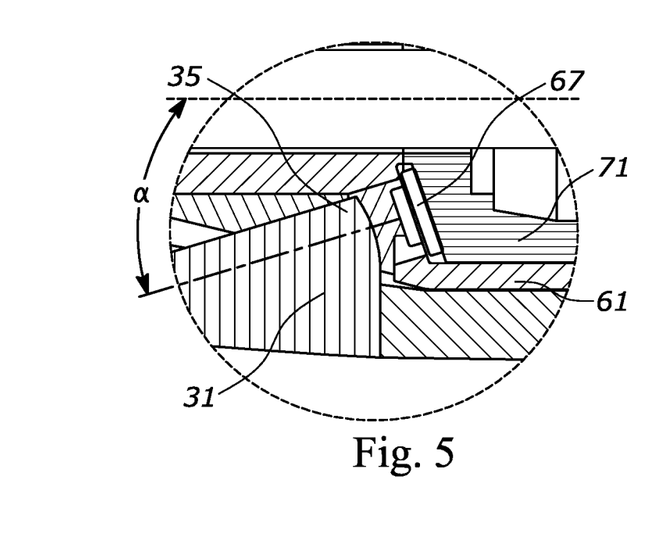
Figure 6:
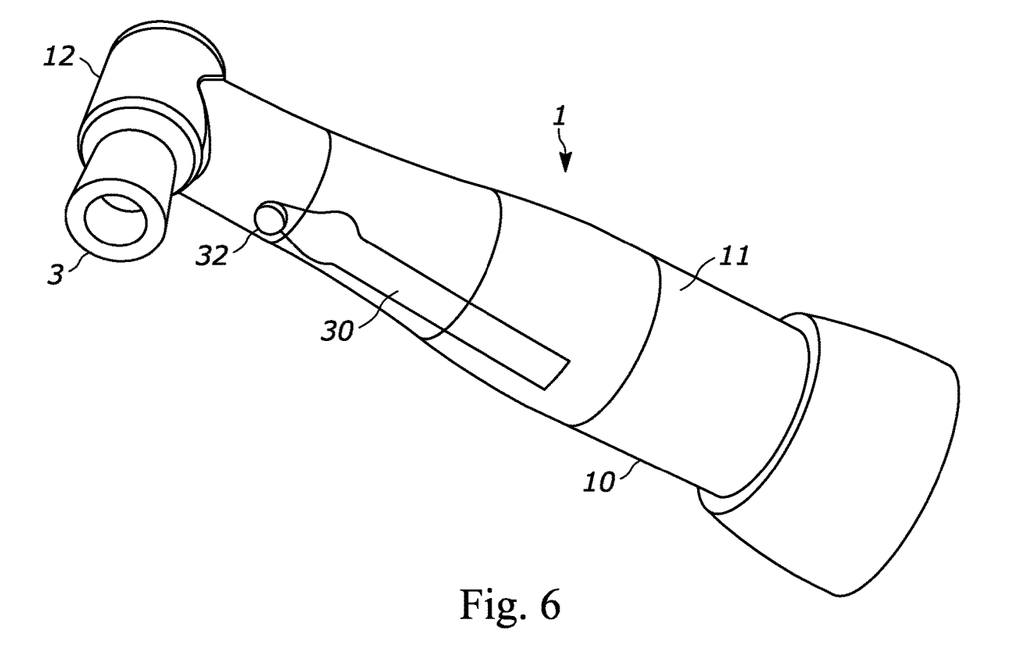

In some examples, the light source 67 is soldered onto a surface of a carrier portion of the adapter element 60, for example onto a beveled surface (see FIG. 5). In some examples, a 3D-MID (three-dimensional molded interconnect device) carrier 71 is used, and the LED light source 67 is contacted by electrically conductive components. It may be particularly advantageous that the 3D-MID carrier 71 carries the electrical contacting of the LED light source 67 and the required electrical conductors. In some examples, the electrical contact is routed to an interface facing away from the cleaning device 1 via the electrical conductors. This is done via pockets or grooves recessed in the wall of adapter element 60. The pockets extend over the entire length of the 3D-MID carrier 71 and the 3D-MID carrier 71 is primarily rotationally symmetrical. In some examples a component 69 is integrated on one eccentrically offset surface of the carrier 71. The component 69 serves to detect the electric coupling with the LED light source 67. A resistor can be used for this purpose, which is preferably connected in parallel to the LED light source 67.

With continued reference to FIGS. 3-7, an outer sleeve 61 of the adapter element 60 is primarily rotationally symmetrical and has an opening and a groove for the light exit. This opening is approximately round and serves to ensure the light emission. The groove is designed in such a way that the cleaning device 1 can dip onto the outer sleeve 61 when it is plugged on, to achieve the smallest possible distance between the LED light source 67 and the light entry portion 31 of light guiding element 30. In some examples, an elevation 35 is attached to the light guiding element 30 and dips into this groove during the plug-in process. In this way, a pre-centering of the cleaning device 1 with respect to the adapter element 60 is achieved and the cleaning device 1 is secured against a rotational movement with respect to the adapter element 60. This results in the positive effect that the location of the light entry portion 31 of the light guiding element is precisely defined with respect to the LED light source 67.

The angled-head rotary cleaning device 1 contains the light guiding element 30 on the lower side facing the cleaning tool 3, which is located at the head portion 12. The light guiding element 30 is geometrically designed to integrate into the outer geometry of the longitudinal neck portion 11 and has a light exit portion 32 at its front end near the cleaning tool 3. In the illustrated example, the light exit is preferably affected by the continuation of the light guiding element 30 at an angle such that the light is emitted from the outer contour of a wall 16 of the neck portion 11. In some examples, the angle is 72°+/−15° relative to the axis of rotation I. The light exit portion 32 then closes the outer geometry of the cleaning device 1 in the direction to the cleaning tool 3.

Figure 7:
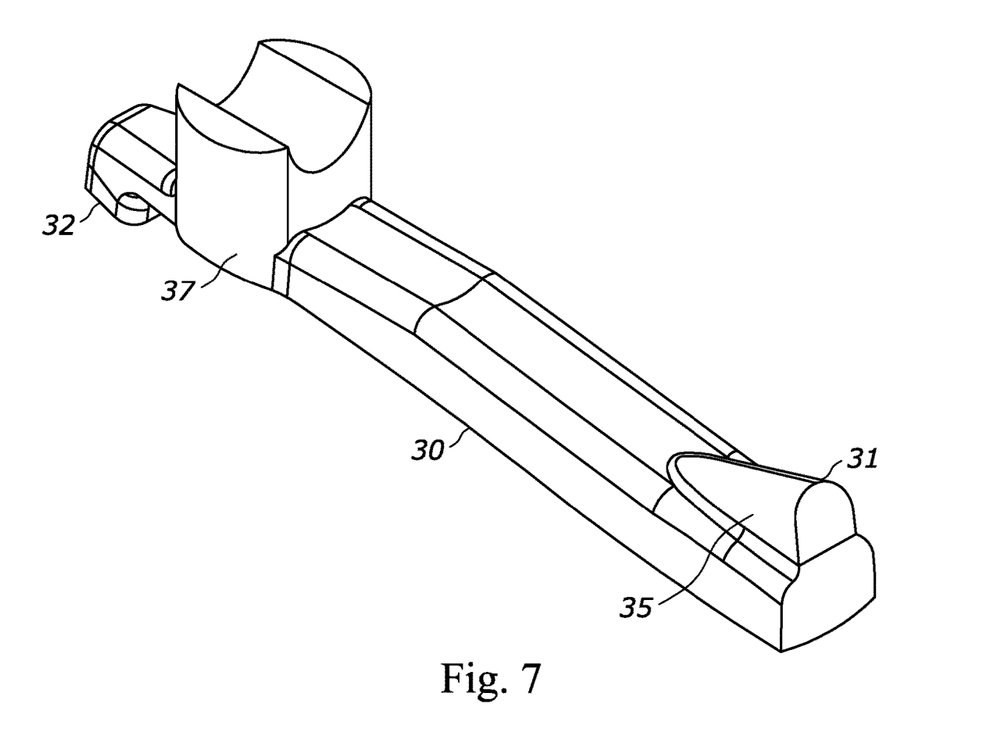
FIG. 7 illustrates the light guiding element of the example of FIGS. 3 to 6 in isolated form.

The light guiding element 30, including the light entry portion 31 and the light exit portion 32, is shown in more detail in FIG. 7. The light guiding element 30 has an elevation 35 in the direction of the axis of rotation I at the light entry portion 31 which serves to secure the cleaning device 1 against rotation with respect to the adapter element 60. This elevation 35 also forms a lens with, for example, a convex shaped light entry surface 36 to improve the light entry into the light guiding element 30.

In some examples, the light guiding element 30 has an integrally formed catching portion 37. In the illustrated example, the catching portion 37 forms a part-cylindrical bearing surface, which engages an intermediate portion of the transmission element 5 located between two disc-shaped flange portions 7 and 8. When the light guiding element 30 is attached to the housing 10 of the cleaning device 1, this catching portion 37 secures and fixes the transmission element 5 in the axial direction so that the front coupling portion of the transmission element 5 engages the second rotary element 4 to which the cleaning tool 3 is attached.

With continued reference to FIGS. 3-7, in the illustrated example the light guiding element 30 is connected to housing 10 of the cleaning device 1 by a form-locking connection. In particular, the light guiding element 30 is snap-fittingly attached to the sleeve 15 formed by the neck portion 11. For production of the cleaning device 1, the housing 10 is formed—for example by injection molding—and the transmission element 5 and the second rotary element 4 with the cleaning tool 3 are inserted into the housing 10. In a final production step, the light guiding element 30 is attached to the housing 10 to complete the outer contour of cleaning device 1 and at the same time secure the transmission element 5 against axial movement.

In some examples, in addition to the latching of the catching portion 37 near the cleaning tool 3, there is a further latching on the inside of the light guiding element 30 at the end remote from the cleaning tool 3 to ensure that the light guiding element 30 is fixed at this point of the cleaning device 1. This latch may be released by a snap connection, which latches internally in the geometry of the outer sleeve 61.

The length of the light guiding element 30 may be kept as short as possible to keep the transmission losses as low as possible. Furthermore, a short design increases the stability of the snap-fit connection and thus the fixation of the light guiding element 30 in the cleaning device 1. For example, in some examples the light guiding element 30 has a length of 23+10/−5 mm, and is made of a light conducting material (e.g., a light conducting thermoplastic material like PMMA (Polymethylmethacrylate) or PC (polycarbonate)).

Accordingly, in some examples the cleaning device 1 includes a total of only four separate elements which are all manufactured in standard processes such as injection molding. Further, mounting of these four components can be realized in a fast and efficient way.

In some examples, the light entry portion 31 of the relatively short light guiding element 30 is located at an intermediate position in the longitudinal direction of the neck portion 11. In this case, the light source 67 of the adapter element 60 is located in the front region of the cylindrical coupling element, which is inserted into the rear end of cleaning device 1 during the coupling process.

Figure 8:
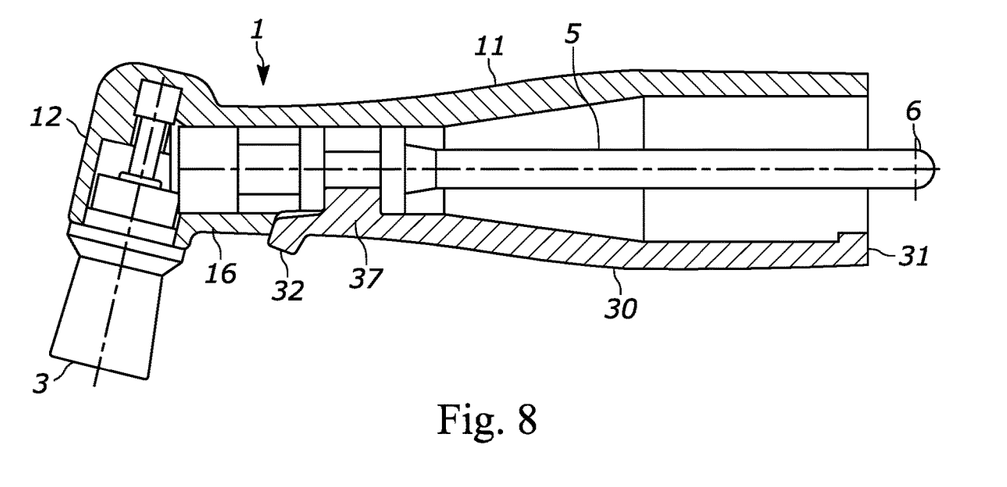
FIGS. 8 to 10 illustrate further alternatives for snap-fittingly attaching a light guiding element to a disposable prophy angle.

In an alternative solution shown in FIG. 8, the longitudinal extension of the light guiding element 30 is increased such that the light entry portion 31 is generally flush with the rear end of neck portion 11. This requires an adaptation of the location of the LED light source 67 of the adapter element 60, which is therefore arranged at a corresponding surface portion facing toward the light entry portion 31 of the light guiding element 30. The resulting cleaning device 1 with elongated light guiding element 30 is shown in FIG. 8. In this example, the mechanical latching of the light guiding element 30 does not take place at the point of light in-coupling but at an intermediate position.

Figure 9:
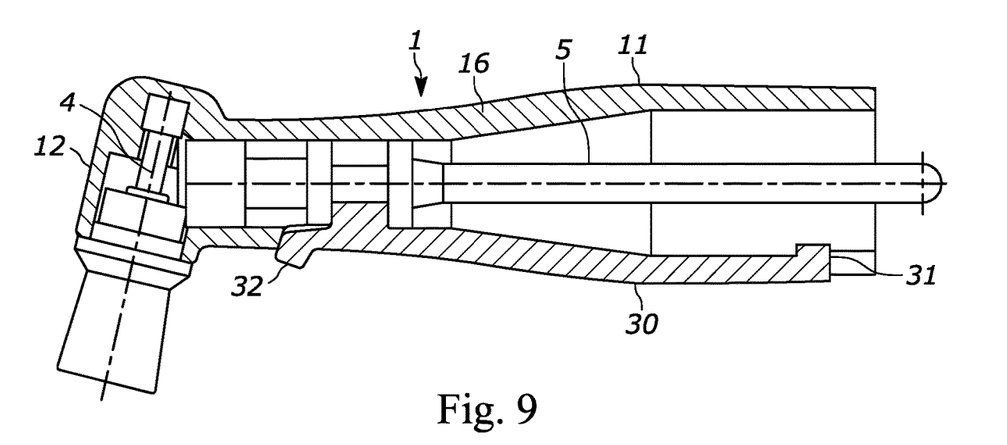

With reference to FIG. 9, in some examples the length of the light guiding element 30 is again increased compared to the example shown in FIGS. 3-7 but wherein the light guiding element 30 ends in a recessed light in-coupling portion of the housing 10 of the cleaning device 1. The recessing of the light guiding element 30 ensures that a corresponding protrusion provided at the adapter element 60 can engage this recess (again to secure the cleaning device 1 against rotation at the point where the light in-coupling takes place).

Figure 10:
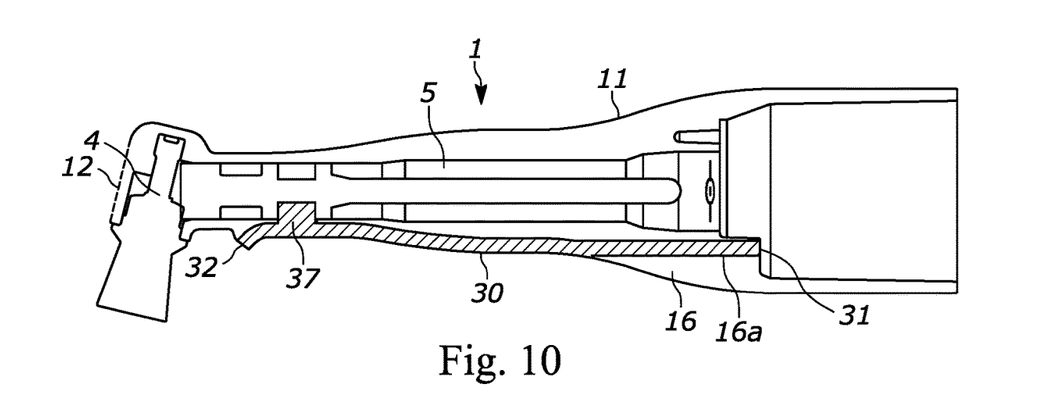

With reference to FIG. 10, in some examples the cleaning device 1 directly couples with the motor handpiece 50 (not shown in FIG. 10). This solution corresponds to the general alternative solution shown in FIG. 2c wherein the housing 10 of the cleaning device 1 is extended in a longitudinal direction to increase the distance between the cleaning tool 3 to the driving component. Again, the light guiding element 30 is formed as an element, which is snap-fittingly attached to the wall 16 of the neck portion 11. In this example, the wall 16 of the neck portion 11 includes a short channel portion 16a close to the coupling region in which the rear end of light guiding element 30 is inserted during the mounting process. The front portion of the light guiding element 30 includes the catching portion 37 which is snap-fittingly attached to the neck portion 11, similar to the examples shown in FIGS. 3-9. With continued reference to FIG. 10, the separate adapter element 60 is not necessary, and the number of components of the complete cleaning system is further reduced.

The light transmission from the driving component to the cleaning device 1 can additionally be used to secure the cleaning device 1 against rotation. In such examples, the light guiding element 30 ends in a slightly protruding latching lug that engages in a corresponding recess in an end face of the motor handpiece 50, in which the LED light source 67 is also arranged. A reversed configuration in which the LED light source 67 of the motor handpiece 50 is arranged on a projection or latching lug is also possible.

For all examples discussed so far, a form-fitting connection is used for attaching the light guiding element 30 to the housing 10 of the cleaning device 1 and where a snap-fitting connection is used. An alternative possibility to attach light guiding element 30 to the cleaning device 1 is shown in FIGS. 11-14.

Figure 11:
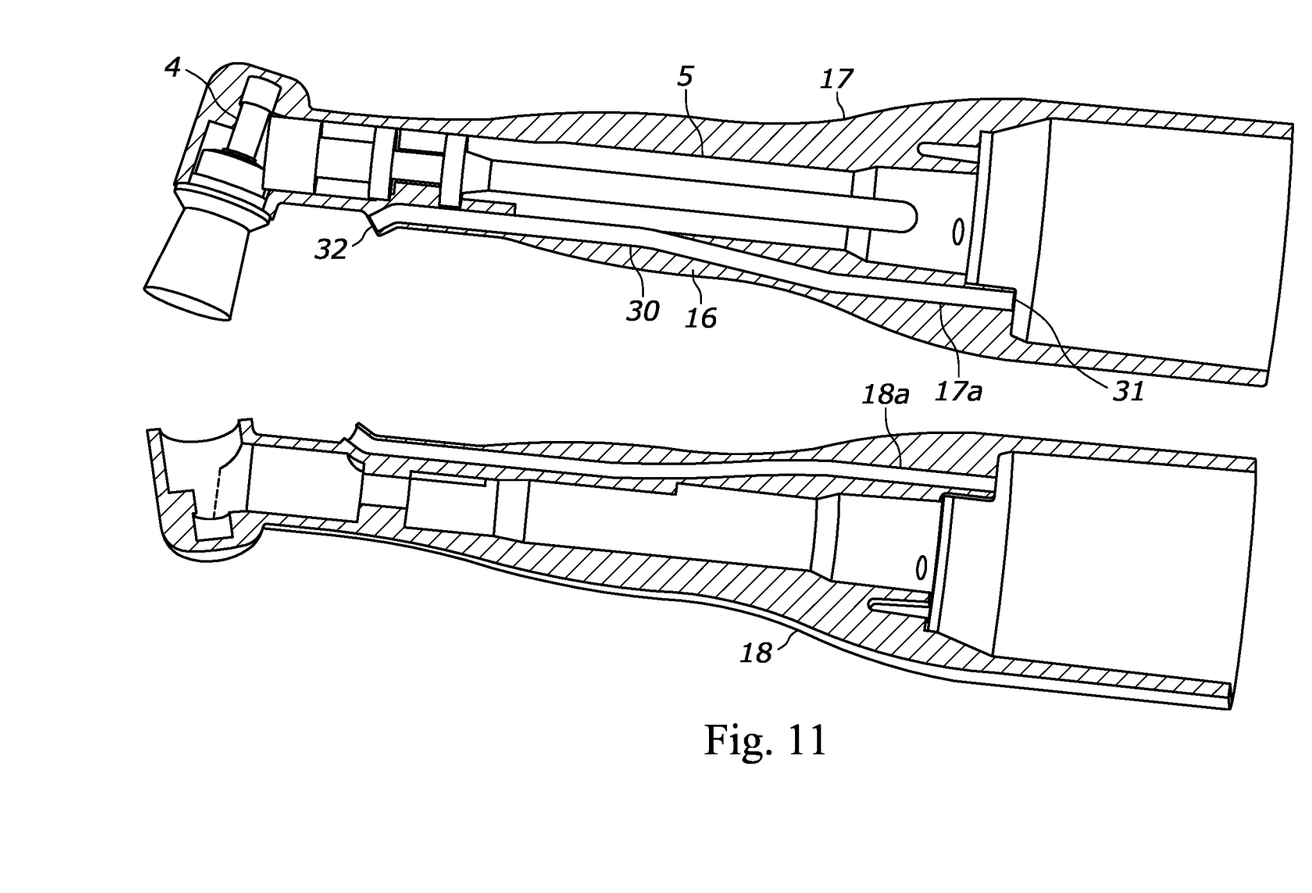
FIGS. 11 to 14 illustrate further examples, in which the light guiding element is clampingly held by housing parts of the disposable prophy angle.

With reference to FIGS. 11-14, is some examples the housing 10 clampingly holds the light guiding element 30. This is achieved by providing two separate housing components 17 and 18 as shown in FIG. 11, which form half shells of the housing 10 and are attached to each other during the mounting process to hold all internal components. In particular, at first the transmission elements 4, 5 including the cleaning tool 3 are inserted into one of both half shells 17 and the second half shell 18 is then connected with the first half shell 17 for example by a specific clamping or ledging mechanism. In a similar manner, the light guiding element 30 is integrated in the wall 16 of the neck portion 11. In this example, both housing components 17 and 18 include corresponding longitudinal grooves 17a and 18a in their respective walls. The grooves 17a, 18a cooperate to form a channel for accommodating at least a portion of the longitudinal light guiding element 30 (e.g., for accommodating the light guiding element 30 over its entire length).

Figure 12:
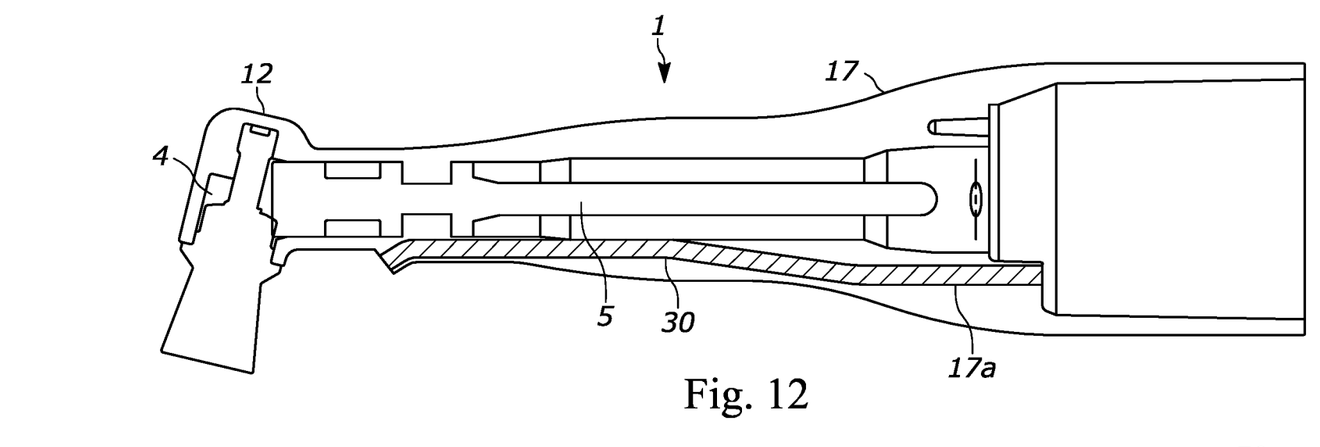
Figure 13:
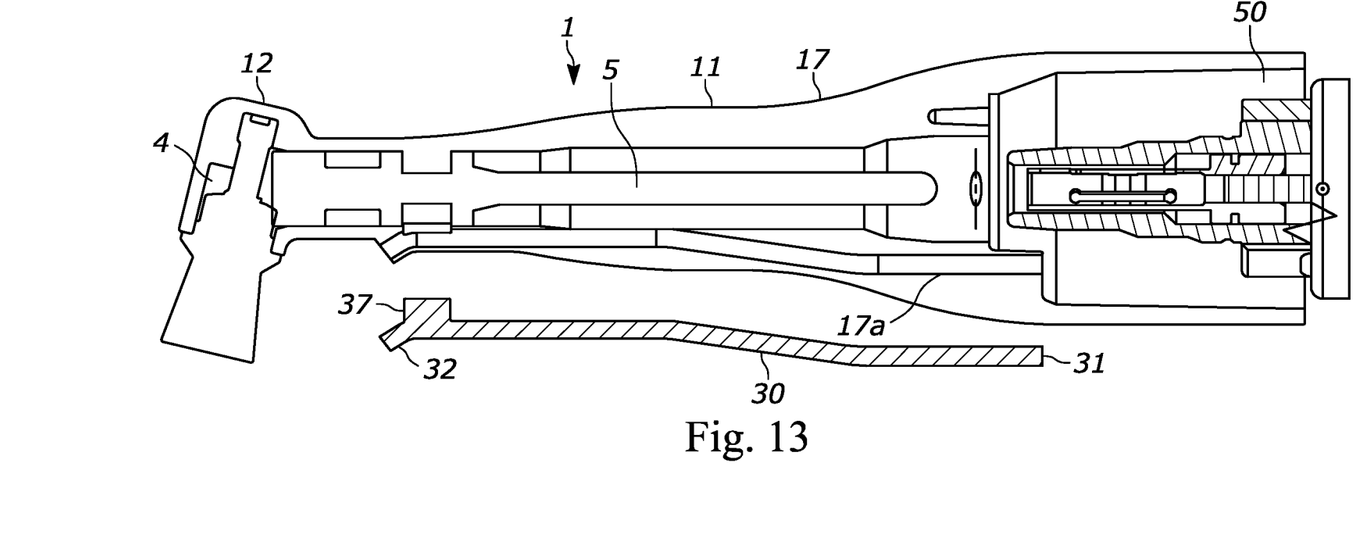
Figure 14:
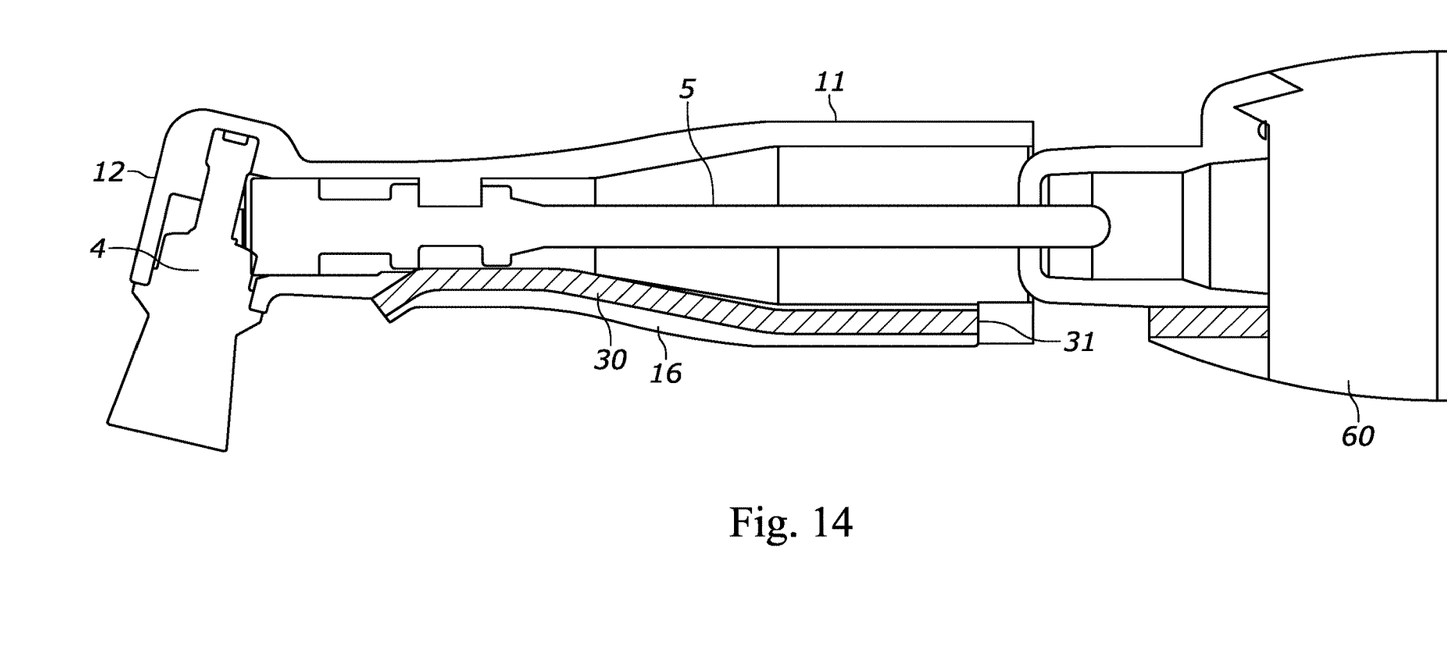

With reference to FIGS. 11 and 12, in some examples the structure of the light guiding element 30 is less complex as compared to the solution shown in FIGS. 3-10, simplifying the production process. In particular, the diameter of the light guiding element 30 is is constant over the whole length. However, as shown for example in FIG. 13, in this alternative solution the front portion close to the light exit portion 32 of the light guiding element 30 can include a catching portion 37 which again serves to secure the longitudinal transmission element 5 within the cleaning device 1. Further, similar to the examples discussed above, the light entry portion 31 of the light guiding element 30 can additionally serve to secure the cleaning device 1 against a rotational movement. This is achieved by either providing the light guiding element 30 with a light entry portion 31, which forms or is located in a protrusion engaging in a recess of the corresponding driving component 50 or 60 (FIG. 13) or by arranging the light entry portion 31 in a corresponding recessed portion in which a protrusion provided at the driving component 50, 60 engages (FIG. 14). As shown by FIGS. 11-14, the cleaning device 1 can be provided either in the short configuration where the adapter element 60 is used for coupling with the motor handpiece 50 or in the elongated configuration for a direct coupling with the motor handpiece 50.

Figure 15A:
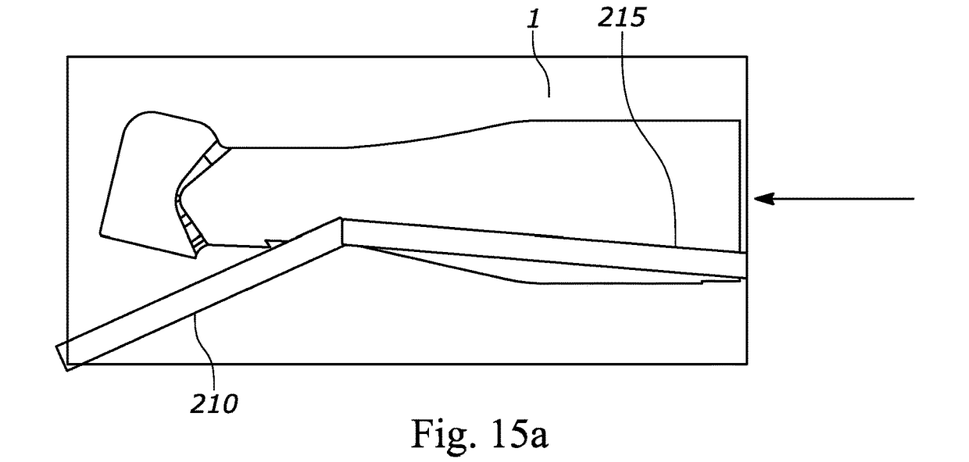
FIGS. 15a to 15c illustrate a further example in which a material locking connection for the light guiding element is obtained.
Figure 15B:
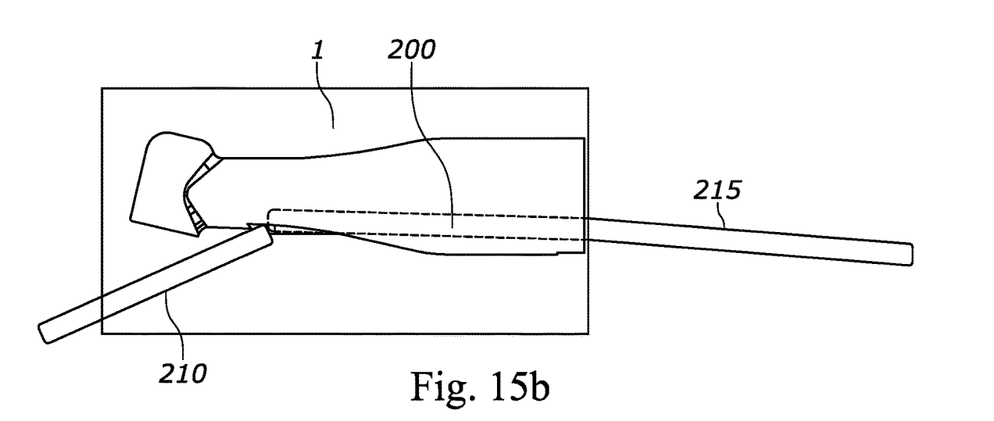
Figure 15C:
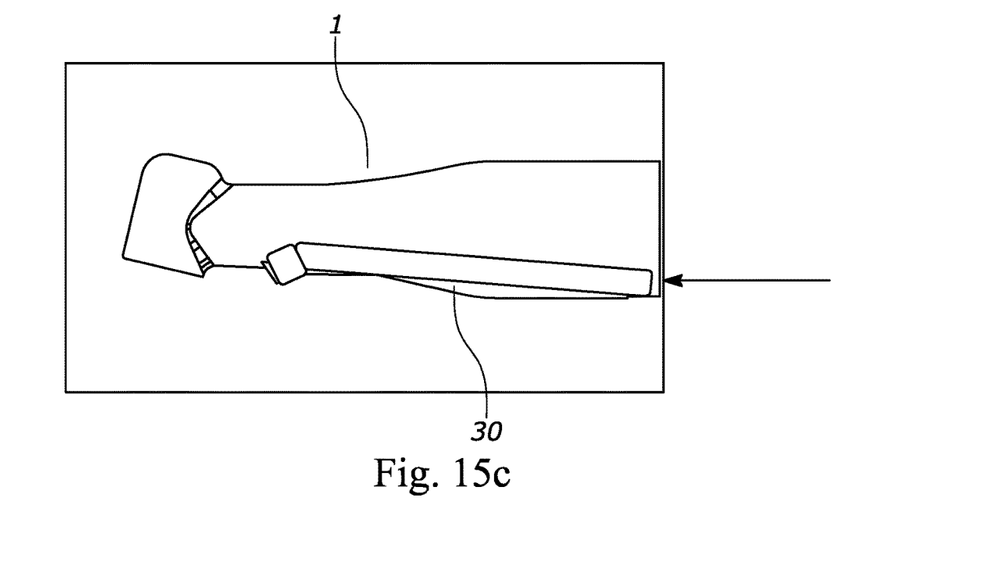

With reference to FIGS. 15a-15c, a third option to integrate the light guiding element 30 into the cleaning device may be used. Here, a material-locking connection is used in which the light guiding element 30 is permanently attached to the housing 10 of the cleaning device 1.

A first solution for achieving such a material bond is illustrated in FIGS. 15a to 15c, using a two-component plastic injection molding process performed in two stages. In this example, the housing 10 of the cleaning device 1 is first molded (FIG. 15a), leaving a channel or groove 200 that is then filled with a second material that forms the light guiding element 30. To maintain the channel or groove 200, certain slides 210 and 215 are arranged in the mold during the molding of the housing 10, which are removed after the material forming the housing 10 of the cleaning device 1 has hardened (FIG. 15b). This creates a longitudinal channel or groove 200 which, in a second step (FIG. 15c), is filled with the material forming the light guiding element 30.

As an alternative solution, it is possible to produce in a first step the light guiding element 30, then place the light guiding element 30 within the mold for manufacturing the cleaning device housing 10 and molding the cleaning device 1 in a second step. Also by this over-molding process, an integral and permanent connection between the housing 10 and the light guiding element 30 is achieved.

The light guiding element 30 may have similar features as the light guiding element 30 explained in connection with the examples shown in FIGS. 3-14 with the exception of the catching portion 37. However, the light guiding element 30 may not only be used to transfer light but also to help to improve the coupling to the driving component (50, 60) by additionally securing the cleaning device 1 against rotation.

Accordingly, the present disclosure provides several solutions for efficiently integrating a light guiding element 30 in a disposable cleaning device 1.

Although various aspects and examples have been described in detail with reference to certain examples illustrated in the drawings, variations and modifications exist within the scope and spirit of one or more independent aspects described and illustrated.

What is claimed is:

1. A disposable, single use angled-head rotary cleaning device for dental purposes, the cleaning device comprising:
   a disposable, single use plastic housing having an elongated neck portion that defines a sleeve with a wall, wherein the neck portion includes a first end and a second end, the plastic housing having a head portion coupled to the first end of the neck portion and angled relative to the neck portion; and
   a disposable, single use elongated light guiding element having a light entry portion to receive light, and a light exit portion to emit light;
   wherein at least a portion of the light guiding element is accommodated within the wall of the neck portion;
   wherein the light guiding element is held by the neck portion via a form locking connection with the neck portion;
   wherein a portion of the light guiding element that extends between the light entry portion and the light exit portion is exposed and defines a portion of an exterior surface of the neck of the angled-head rotary cleaning device, wherein only the portion of the exterior surface of the neck that is defined by the light guiding element is illuminated along the neck.

2. The angled-head rotary cleaning device according to claim 1, further comprising a cleaning tool coupled to the head portion, wherein the cleaning tool is positioned on a bottom side of the cleaning device, wherein the light guiding element is elongated in a longitudinal direction of the cleaning device and is also positioned on the bottom side of the cleaning device, and wherein the light exit portion is positioned to emit light toward the cleaning tool.

3. The angled-head rotary cleaning device according to claim 1, wherein the light guiding element is a separate element snap-fittingly attached to the neck portion.

4. The angled-head rotary cleaning device according to claim 1, wherein the neck portion includes two housing components which are latched with each other, thereby clampingly holding the light guiding element in place, wherein each of the two housing components is a half shell.

5. The angled-head rotary cleaning device according to claim 4, wherein each of the two housing components includes a portion of the wall and a corresponding longitudinal groove in its respective portion of the wall, each groove forming a channel for accommodating at least a portion of the light guiding element.

6. The angled-head rotary cleaning device according to claim 1, further comprising a transmission element disposed within the plastic housing, wherein the light guiding element includes a catching portion facing toward an interior of the neck portion, wherein the catching portion is in direct contact with the transmission element and axially fixes the transmission element.

7. The angled-head rotary cleaning device according to claim 1, wherein the light guiding element is held by the neck portion via a material-locking connection.

8. The angled-head rotary cleaning device according to claim 7, wherein the light guiding element is an injection molded component, and wherein the wall of the neck portion defines a channel or groove in which a material forming the light guiding element is disposed.

9. The angled-head rotary cleaning device according to claim 7, wherein the light guiding element is connected to the neck portion by an over-molding of the light guiding element with the plastic forming the neck portion.

10. The angled-head rotary cleaning device of claim 1, wherein all components of the angled-head rotary cleaning device are plastic.

11. A dental cleaning system comprising:
the angled-head rotary cleaning device according to one of claim 1;
a driving component coupled to the angled-head rotary cleaning device, wherein the driving component is releasably coupled to the second end of the neck portion and includes a coupling portion;
wherein the light entry portion of the light guiding element is coupled to the coupling portion of the driving component for securing the cleaning device against rotation with respect to the driving component, and
wherein the light entry portion is located in a protrusion or a recess of the angled-head rotary cleaning device, wherein the protrusion or recess is configured to engage with a corresponding recess or protrusion on the driving component.

12. The dental cleaning system according to claim 11, further comprising a transmission element disposed within the plastic housing, wherein the driving component includes a clamping mechanism, and wherein the transmission element includes an elongated driving shaft having at a rear end a pin-shaped coupling portion which is coupled with the clamping mechanism of the driving component.

13. A disposable, single use angled-head rotary cleaning device comprising:
a disposable, single use plastic housing having an elongated neck portion that defines a sleeve with a wall, wherein the neck portion includes a first end and a second end, the plastic housing having a head portion coupled to the first end of the neck portion and angled relative to the neck portion;
a disposable, single use transmission element disposed within the plastic housing, wherein the transmission element includes an elongated driving shaft having at a rear end a pin-shaped coupling portion; and
a disposable, single use elongated light guiding element coupled to the neck portion, the light guiding element having a light entry portion for receiving light provided by a driving component, and a light exit portion positioned to emit light.

14. The angled-head rotary cleaning device of claim 13, further comprising the driving component, wherein the driving component is releasably coupled to the second end of the neck portion, the driving component having a clamping mechanism, wherein the pin-shaped coupling portion is coupled with the clamping mechanism of the driving component.

15. A disposable, single use angled-head rotary cleaning device comprising:
a disposable, single use plastic housing having an elongated neck portion that defines a sleeve with a wall, wherein the neck portion includes a first end and a second end, the plastic housing having a head portion coupled to the first end of the neck portion and angled relative to the neck portion; and
a disposable, single use elongated light guiding element coupled to the neck portion, the light guiding element having a light entry portion configured to receive light provided by a driving component, and a light exit portion positioned to emit light;
wherein the light guiding element is configured to be coupled to a connecting portion of the driving component for securing the cleaning device against rotation with respect to the driving component.

16. The angled-head rotary cleaning device of claim 15, further comprising the driving component, wherein the driving component includes means for providing light to the light guiding element of the cleaning device.

17. The angled-head rotary cleaning device of claim 15, further comprising a transmission element disposed within the plastic housing, wherein the transmission element includes an elongated driving shaft having a pin-shaped coupling portion, wherein the driving component includes a driving shaft with a clamping mechanism coupled to the pin-shaped coupling portion.

18. The angled-head rotary cleaning device of claim 15, wherein the driving component is a motor handpiece having a motor, and wherein the motor handpiece includes a light source facing toward the light entry portion of the light guiding element.

19. The angled-head rotary cleaning device of claim 15, further comprising a transmission element disposed within the plastic housing, wherein the driving component includes an adapter element and a motor handpiece, wherein the adapter element is coupled to the neck portion and positioned between the neck portion and the motor handpiece;
wherein the adapter element includes transmission elements for transmitting rotary movement provided by the motor handpiece to the transmission element, and wherein the adapter element includes one of:
a) a light source located at a first end for providing light to the light guiding element; or
b) a light guide facing with a first end toward the motor handpiece for receiving light provided by a light source of the motor handpiece and facing with a second end toward the light entry portion of the light guiding element.

* * * * *